United States Patent [19]
Gamble et al.

[11] Patent Number: 5,124,925
[45] Date of Patent: Jun. 23, 1992

[54] METHOD FOR CONTROLLING EAST/WEST MOTION OF A GEOSTATIONARY SATELLITE

[75] Inventors: Donald W. Gamble; Lisa K. White, both of Menlo Park, Calif.; Thomas J. Kelly, Franklin, Ohio; Ronald H. Bingaman, Davis, Calif.

[73] Assignee: Space Systems/Loral, Inc., Palo Alto, Calif.

[21] Appl. No.: 464,799

[22] Filed: Jan. 16, 1990

[51] Int. Cl.$^5$ ............................................. B64G 1/24
[52] U.S. Cl. .................................. 364/459; 244/164; 364/434
[58] Field of Search ............................ 364/459, 434; 244/164–171

[56] References Cited

U.S. PATENT DOCUMENTS

| | | | |
|---|---|---|---|
| 4,325,124 | 4/1982 | Renner | 364/459 |
| 4,521,855 | 6/1985 | Lehner et al. | 364/434 |
| 4,537,375 | 8/1985 | Chan | 244/171 |
| 4,599,697 | 7/1986 | Chan et al. | 364/434 |
| 4,752,884 | 6/1988 | Slafer et al. | 364/434 |
| 4,758,957 | 7/1988 | Hubert et al. | 364/434 |
| 4,767,084 | 8/1988 | Chan et al. | 244/164 |
| 4,776,540 | 10/1988 | Westerlund | 244/164 |
| 4,827,421 | 5/1989 | Dondl | 364/459 |
| 4,837,699 | 6/1989 | Smay et al. | 364/434 |

OTHER PUBLICATIONS

M. C. Eckstein, "Station Keeping Strategy Test, Design and Optimization by Computer Simulation," *Space Dynamics for Geostationary Satellites*, Oct. 1985, Toulouse, France (CEPAD).

A. Kamel et al., "On the Orbital Eccentricity Control of Synchronous Satelllites," *The Journal of the Astronautical Sciences*, vol. 30, No. 1 (Jan.–Mar. 1982), pp. 61–73.

C. F. Gartrell, "Simultaneous Eccentricity and Drift Rate Control," *Journal of Guidance and Control*, vol. 4, No. 3 (May–Jun. 1981), pp. 310–315.

E. M. Soop, "Introduction to Geostationary Orbits," *European Space Agency*, (Nov. 1983), Publication SP-1053, pp. 1–143.

A. Kamel et al., "East-West Stationkeeping Requirements of Nearly Synchronous Satellites Due to Earth's Triaxially and Luni-Solar Effects," *Celestial Mechanics*, vol. 8 (1973), (D. Reidel Publishing Co., Dordrecht-Holland), pp. 129–148.

D. J. Gantous, "Eccentricity Control Strategy for Geosynchronous Communications Satellites," *Telesat Canada*, May 1987.

J. A. Kechichian, "A Split $\Delta V$ for Drift Control of Geosynchronous Spacecraft," *AIAA/AAS 21st Aerospace Sciences Meeting*, (Jan. 10–13, 1983), AIAA-8-3-0017.

S. Parvez et al., "East-West Stationkeeping Near an Equilibrium Longitude at 105 Degrees West," *AAS/AIAA Astrodynamics Specialist Conference*, AAS-8-7-545 (Aug. 10–13, 1987), pp. 1–14.

*Primary Examiner*—Thomas G. Black
*Attorney, Agent, or Firm*—Edward J. Radlo; Kenneth R. Allen

[57] ABSTRACT

A method for East/West stationkeeping of a geostationary satellite maintains the osculating value of longitude from exceeding a specified deadband for a specified drift period between maneuvers. In the planning, the mean longitude, the mean drift rate and the mean eccentricity vector are calculated and then maneuvers are executed to maintain the values below a magnitude such that the osculating longitude will be within the specified deadband over a specified drift period. The target conditions are achieved through a plurality of maneuvers which initiate a period of free drift which lasts for a specified number of days. During the free-drift period, longitude remains within its deadband, and no additional maneuvers are needed or are performed. The method has the advantage that it can take into account limitations on thruster on-time by allowing for a generalized number of stationkeeping maneuvers.

10 Claims, 5 Drawing Sheets

METHOD FOR CONTROLLING EAST/WEST MOTION OF A GEOSTATIONARY SATELLITE

BACKGROUND OF THE INVENTION

This invention relates to a method for simultaneously controlling the mean eccentricity and the longitudinal (East/West) motion of a geostationary satellite.

A method for controlling the East/West motion of geostationary satellites is of interest due to the stringent constraints imposed upon a satellite's longitudinal motion by ground-based antennas. The two methods of orbital control are referred to as North/South stationkeeping, which controls latitude excursions, and East/West stationkeeping, which controls longitude excursions. Though it is understood that there can be a cross-coupling effect during North/South stationkeeping maneuvers, attention herein is directed to the East/West control problem and neglects the effect of North/South maneuvers in the East/West direction.

With the increase of capability of the on-board payloads on satellites, there is a proportional increase in the power requirement of the payloads. The conventional solution is to enlarge the surface area of solar panels attached to the satellite in order to increase reception of available solar power. However, increasing the surface area of solar arrays enhances the perturbing force due to solar radiation pressure. Specifically, the solar panels act as sails driven by the solar wind with a force directly proportional to the area-to-mass ratio of the satellite.

Perturbations caused by solar radiation pressure result in the change in the magnitude of orbital effects of solar radiation pressure cause eccentricity magnitude to vary with a yearly period during which time the eccentricity magnitude will grow to a value that may cause apparent longitudinal motion (East/West motion) to exceed the limits of the permissible deadband. Eccentricity appears as daily longitudinal oscillations about the nominal location of the geostationary satellite as observed from a position on the Earth.

For geostationary satellites, the mean longitudinal acceleration is governed by the non-spherical effects of the Earth and the gravitational effects of the Sun and the Moon. In general, the Earth's tesseral harmonics are the dominant contribution to the longitudinal behavior, and their effects can be considered constant over longitudinal variations of less than 1 degree ($<1°$). However, for satellites near the Earth's gravitational equilibrium points, the longitudinal acceleration due to the Earth becomes small in comparison to that due to the Sun and the Moon. It is of interest that there are two stable equilibrium locations and two unstable equilibrium locations for satellites at geostationary altitude. The longitudinal acceleration caused by luni-solar effects dominate the mean longitudinal behavior near the equilibrium points and have significant effects away from the equilibrium points (FIG. 1). Therefore, an accurate model of the Sun's and Moon's effects on the orbital motion of the satellite must be used in order to target the longitude and longitudinal drift rate needed to initiate a proper free-drift cycle for any arbitrary satellite station location. It is necessary to account for a longitudinal acceleration that is not constant, but which is time varying in magnitude and, for station locations near an equilibrium point, in direction as well.

In order to appreciate the variability of longitudinal acceleration, reference is made to FIG. 1 which illustrates the long-periodic behavior of the longitudinal acceleration over a period of one month for various station longitudes of an object in geostationary orbit. The curves represent longitudinal accelerations in degrees per days squared (°/day$^2$). The longitudinal acceleration is time-varying with a period of approximately 13.6 days. This graph illustrates the complexity of East/West stationkeeping, especially near an equilibrium point in that at the longitudinal acceleration can change direction. Moreover, due to variations in the gravity at different positions on the Earth, the value of the longitudinal acceleration will vary with the Earth's longitude.

An additional factor to consider is the solar radiation pressure effects on a spacecraft. Effects due to solar radiation pressure will perturb an orbit in such a way as to move the eccentricity vector perpendicular to the Earth-Sun line and in the direction of the orbital motion. If allowed to proceed naturally, this would result in an eccentricity vector roughly describing an ellipse with a peak magnitude possible greater than the allowable deadband and with a period of approximately one year. Superimposing the luni-solar effects onto this behavior serves to distort the ellipse and to cause local variations in the magnitude and rotation rate of the eccentricity vector. Depending upon the area-to-mass ratio of the satellite, the daily excursions of longitude could exceed the deadband by a significant factor.

The eccentricity vector extends from the Earth to the perigee. The value $e_y$ is equal to $[e \sin(\omega)]$, and the value $e_x$ is equal to $[e \cos(\omega)]$, where $\omega$ is the argument of perigee. FIG. 2 is a graph illustrating the mean eccentricity motion $e_x$ versus $e_y$ over a one-year period $t_0$ to $t_T$ due to luni-solar gravitational effects and solar radiation pressure. The solar radiation pressure causes the annual elliptical motion, and the solar gravitation effects result in an ellipse which does not close over a period of one year. The smaller oscillations are primarily due to the Moon's gravitational effects on the satellite and have a period of approximately 13.6 days.

In order to meet the constraints established for controlling East/West stationkeeping of the satellite, the mean values of longitude and drift rate must be maintained to prevent any secular or long-periodic trends caused by the Earth's and the luni-solar gravitational effects from allowing the daily longitude variations to exceed the deadbands for a specified drift period between maneuvers. Furthermore, the mean eccentricity vector (which is manifested as the daily longitude variation) must be maintained below a preselected magnitude so that when superimposed upon the mean longitude, the net, or osculating, longitude will not exceed the specified deadband for the same drift period. Both of these conditions must be met simultaneously using the same set of maneuvers while making efficient use of propellant.

A search of prior art literature uncovered a number of references, only one of which appears to address the effects of the Sun and Moon on eccentricity targeting, although a few address the luni-solar effects on longitude and drift-rate targeting. The following is a summary of the references uncovered and their relevance.

M. C. Eckstein, "Station Keeping Strategy Test, Design and Optimization by Computer Simulation," *Space Dynamics for Geostationary Satellites*, Oct. 1985, Toulouse, France (CEPAD): This paper discusses stationkeeping with small longitudinal deadbands. The luni-solar effects are included by removing some of the deadband, that is, the effects due to the Sun and Moon are considered small, and a certain amount of the deadband is budgeted to these effects. This paper includes a study on the result of a simulation that simultaneously targets eccentricity and longitude to initiate a free-drift cycle and uses the Sun-Pointing Perigee Strategy (SPPS) to target eccentricity. (SPPS is a method for controlling the eccentricity vector by maintaining it in the general direction of the Sun.) The targeting scheme used therein excludes the Sun's and the Moon's gravitational effects on eccentricity. This paper does not address the possibility of a variable longitudinal acceleration due to luni-solar effects, and it assumes that acceleration will be constant in direction and magnitude. This results in a need for an iterative control scheme requiring some operator intervention. This problem is addressed by the present invention.

A. Kamel and C. Wagner, "On the Orbital Eccentricity Control of Synchronous Satellites," *The Journal of the Astronautical Sciences*, Vol. 30, No. 1 (Jan.-Mar. 1982), pp. 61-73: This paper contains many of the fundamental ideas behind the current strategy. The eccentricity targeting strategy therein used the Sun Pointing Perigee Strategy (SPPS) but only included the effects of the solar radiation pressure on eccentricity, thus excluding the luni-solar effects. The calculation of the longitudinal acceleration took into account only the Earth's gravitational effects (tesseral harmonics). The paper also suggests allotment of the luni-solar effects on eccentricity into the deadband budget, thereby tightening the usable deadband and costing more propellant. The present work represents an advancement over this simplification, particularly where the limited deadband constraints renders it unfavorable to include the luni-solar effects by removing part of the available deadband.

C. F. Gartrell, "Simultaneous Eccentricity and Drift Rate Control," *Journal of Guidance and Control*, Vol. 4, No. 3 (May-Jun. 1981), pp. 310-315: This paper describes a method for simultaneous control of eccentricity and drift rate using equations which only take into account solar pressure on orbit eccentricity. The spacecraft considered in this analysis is quite small, so the effect of solar radiation pressure on eccentricity is not large. Thus, the maneuvers required to control drift rate are not required to control eccentricity magnitude, therefore, only one maneuver is required. The maneuver strategy is not generalized to N-maneuvers (where N is an arbitrary number of maneuvers), and the equations do not consider the gravitational effects of the Sun and the Moon in the targeting strategy.

E. M. Soop, *Introduction to Geostationary Orbits*, European Space Agency (Nov. 1983), Publication SP-1053, pp. 1-143: This work provides a fairly broad explanation of orbital control of geostationary satellites. Particular attention is directed to Chapter 7 relating to longitude stationkeeping. It discusses the Sun-Pointing Perigee Strategy to target eccentricity and the use of two maneuvers to simultaneously target both drift rate and eccentricity in order to maintain the longitudinal deadband.

A. Kamel et al., "East-West Stationkeeping Requirements of Nearly Synchronous Satellites Due to Earth's Triaxiality and Luni-Solar Effects," *Celestial Mechanics*, Vol. 8 (1973), (D. Reidel Publishing Co., Dordrecht-Holland), pp. 129-148: This paper describes the equations for the disturbing function (which contains Earth's gravitational effects, as well as the luni-solar gravitational effects). This papers indicates that by not including the perturbations in the orbit caused by the Moon's and Sun's gravitational effects, longitude and drift rate will be incorrectly targeted. Eccentricity targeting is not mentioned in this paper, nor was any strategy suggested here which would achieve the proper target drift and longitude. Kamel has written several papers which contain a description of an analytic solution addressing the geostationary stationkeeping problem. Not all of those are discussed herein.

D. J. Gantous, "Eccentricity Control Strategy for Geosynchronous Communications Satellites," *Telesat Canada*, May 1987: This paper describes an amended Sun-Pointing Perigee Strategy based on earlier work of Kamel and Wagner. The author observes that the natural motion of the eccentricity vector caused by the solar radiation pressure and the luni-solar gravitational effects will have a linear trend, i.e., the eccentricity plot does not achieve a closed ellipse after a year (as can be seen in FIG. 2). The targeting strategy described therein accounts for this phenomenon. However, the targeting strategy does not consider the local variations due to the gravitational effects of the Sun and the Moon.

J. A. Kechichian, "A Split ΔV for Drift Control of Geosynchronous Spacecraft," *AIAA/AAS* 21st Aerospace Sciences Meeting, (Jan. 10-13, 1983), AIAA-83-0017: This paper discusses the use of a two-maneuver technique over a 24-hour period in order to maintain a longitude deadband of ±0.05° while simultaneously controlling longitude and eccentricity. The author discusses targeting osculating effects, whereas the present invention addresses targeting mean values. The author concludes that his technique will deviate from a specified deadband limit after only a few cycles.

S. Parvez et al., "East-West Stationkeeping Near an Equilibrium Longitude at 105 Degrees West," *AAS/AIAA Astrodynamics Specialist Conference*, AAS-87-545 (Aug. 10-13, 1987), pp. 1-14: This paper describes stationkeeping near a stable equilibrium point. This paper commented on the problems of predicting spacecraft longitudinal motion after a change in orbital velocity due to a required attitude adjustment. This paper did not consider the luni-solar effects and seemed mainly a plea for an explanation for the apparently high sensitivity of longitude motion to attitude maneuvers and the lack of a predictable drift cycle.

Various other papers were uncovered of less relevance than those mentioned above. Further, a search of the Patent Office records relating to this invention uncovered the following patents, none of which are particularly relevant to the problem at hand.

U.S. Pat. No. 4,767,084 to Chan et al. uses momentum unloads to control stationkeeping. There are no instructions on how to control the orbit, and this is a scheme that may not be appropriate for spacecraft with large area-to-mass ratios because inadequate thruster power is available.

U.S Pat. No. 4,521,855 to Lehner et al. relates to physically controlling the attitude of the satellite and does not relate to stationkeeping.

U.S. Pat. No. 4,599,697 to Chan et al. also relates to spacecraft attitude control.

U.S. Pat. No. 4,537,375 to Chan also relates to attitude control.

U.S. Pat. No. 4,776,540 to Westerlund relates to attitude control of a satellite to compensate for changes in latitude.

U.S. Pat. No. 4,837,699 to Smay et al. also relates to attitude control, but in the context of a spinning satellite.

In view of the foregoing, what is needed is a generalized method for East/West stationkeeping and targeting of geosynchronous satellites that uses an arbitrary number of maneuvers and which takes into account luni-solar effects on both eccentricity and longitudinal motion.

SUMMARY OF THE INVENTION

According to the invention, a method is provided for East/West stationkeeping of a geostationary satellite which maintains the osculating value of longitude from exceeding a specified deadband for a specified drift period between maneuvers. This is done by calculating, in a planning operation, the mean longitude, the mean drift rate and the mean eccentricity vector and determining the target conditions such that when stationkeeping maneuvers are performed, the osculating longitude will remain within the specified deadband over a specified drift period. The target conditions are achieved through a plurality of small maneuvers which initiate a period of free drift which lasts several days. During the free-drift period, longitude remains within its deadband, and no additional maneuvers are needed or are performed. The method has the advantage that it can take into account limitations on thruster on-time by allowing for a generalized number of stationkeeping maneuvers.

The invention will be better understood by reference to the following description in connection with the accompanying drawings.

DESCRIPTION OF SPECIFIC EMBODIMENTS

To achieve desired conditions according to the invention, the total change in velocity vector $\Delta V$ required for eccentricity control is first determined. The longitude and drift rate targeting scheme then splits the total change in velocity vector into a plurality of or "N" maneuvers, each of which is sufficiently small so that the daily or short-periodic spacecraft longitudinal oscillations about the designated station do not exceed a predetermined deadband. In the particular scheme adopted, special attention is given to the local variations due to luni-solar effects. After the "N" maneuvers are completed, the free-drift period begins which is based on the long-period oscillations of the spacecraft, herein referred to as the mean parameters. Especially during the free-drift period, the daily oscillations of longitude do not exceed the deadband. It is desired to keep the entire East/West stationkeeping cycle duration to a minimum in order to save propellent, but the cycle should not be so short as to require daily maneuvers. A typical minimum cycle is one week as an operational convenience. This cycle allows up to seven maneuvers and still permits an adequate free-drift period in which to verify orbit parameters through the orbit determination process.

Figure 1:
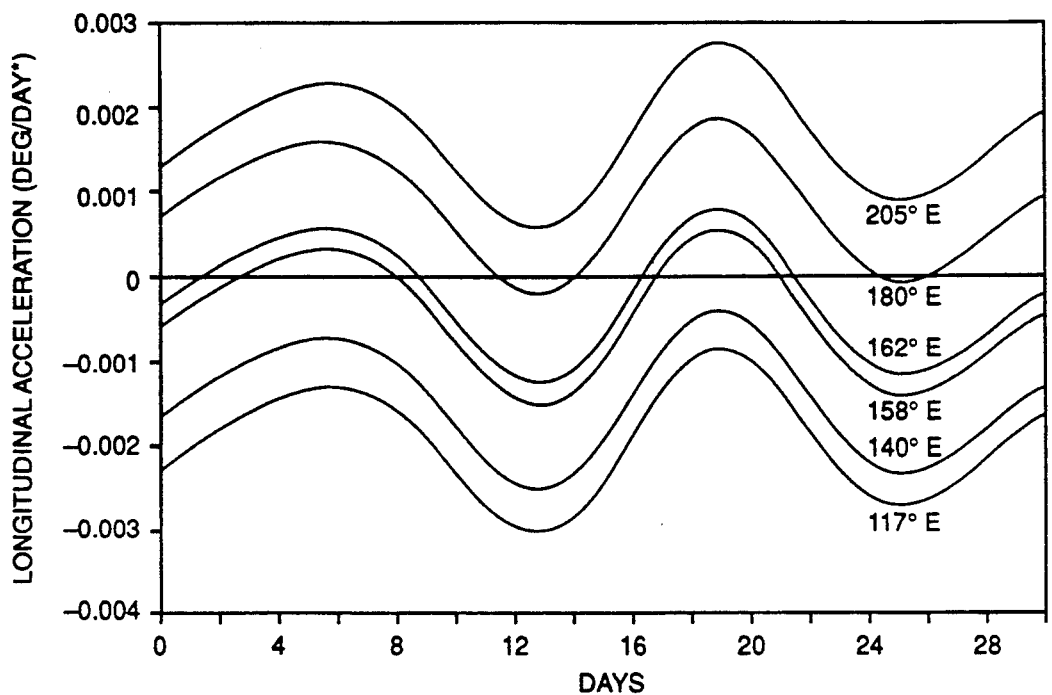
FIG. 1 is a graph of long-periodic behavior of the longitudinal acceleration of an object in geostationary orbit about various station longitudes.
Figure 2:
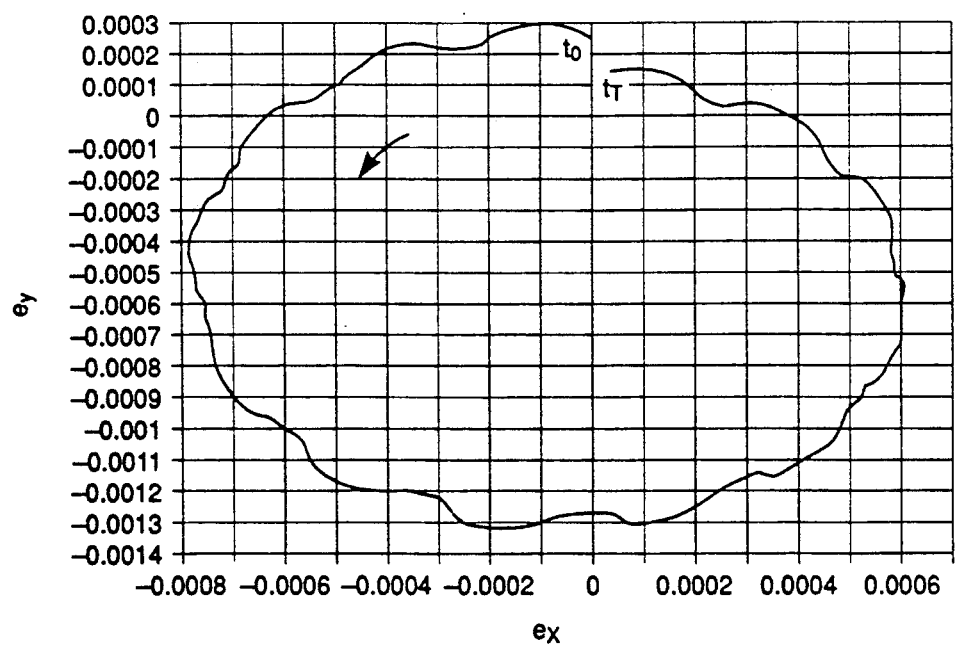
FIG. 2 is a graph illustrating the mean eccentricity motion due to luni-solar effects and solar radiation pressure.
Figure 3:
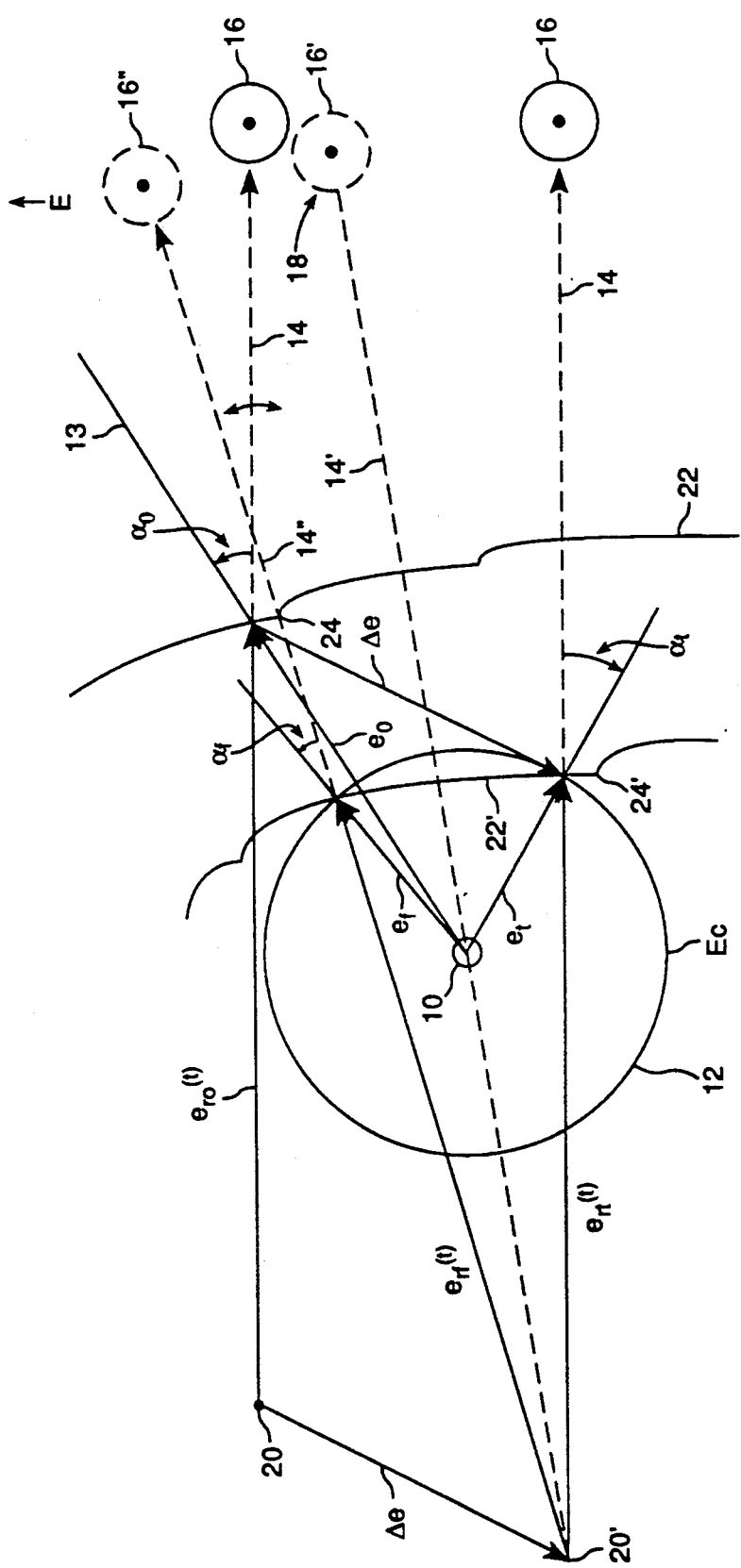
FIG. 3 is a vector diagram for illustrating a Sun-pointing perigee strategy according to the invention.

FIG. 3 is a phase space diagram for illustrating eccentricity control based on the Sun Pointing Perigee Strategy (SPPS). The Earth 10 is located at the center of a constraint circle 12 having an eccentricity magnitude $E_c$ specifying the desired stationkeeping constraint. Eccentricity is initially referenced to an angle $\alpha_o$ between an orbital eccentricity vector 13 and a line 14 drawn between the center of the seasonal eccentricity ellipse 20 and the Sun 16. The line 14 moves with the annual progression of the Sun 16 to a final position of the Sun 16". Therefore, the targeting scheme as explained herein is based on a predicted mean position 18 of the Sun 16' defined as a midpoint in time of the free-drift period following the last maneuver. The targeting equations are referenced to an average Earth-Sun line 14'. Relative movement of the Sun 16 with time is West to East (or counterclockwise in FIG. 3) during its annual progression.

Because of solar radiation pressure on the satellite, the eccentricity vector, e, of the orbit is naturally driven perpendicular to the Earth-Sun line and rotates in the same direction as the orbital motion. The eccentricity magnitude will grow to a seasonal value $e_r$ at a rate dependent on the area-to-mass ratio and the reflectivity characteristics of the satellite.

It is desired to control the eccentricity of the orbit. In FIG. 3, three states of the eccentricity vector e of the orbit are shown: an initial eccentricity vector $e_o$, a target eccentricity $e_t$, and a final eccentricity $e_f$, each of which is referenced to the Earth as an origin. The initial eccentricity vector $e_o$ 13 leads the Earth-Sun line 14. The target eccentricity vector $e_t$ is driven in accordance with the invention by a composite vector $\Delta e$ (which is greatly exaggerated in this diagram) to lag the Earth-Sun line 14 and to bring the target eccentricity vector $e_t$ within the constraint circle 12 (if not already within the constraint circle). The final eccentricity vector $e_f$ is the result of disturbances caused by solar radiation pressure and luni-solar gravitational effects. These effects are represented by a seasonal eccentricity vector $e_r(t)$, shown in various forms as $e_{ro}(t)$, $e_{rt}(t)$, and $e_{rf}(t)$. It is displaced from an origin 20 to an origin 20' by the composite change in the eccentricity vector $\Delta e$. Its track is represented as the original perturbed ellipse 22 and as the final perturbed ellipse 22' as displaced by the target eccentricity vector, $e_t$. Ellipse 22 is the natural path of the seasonal eccentricity vector $e_r$. Ellipse 22' is the path $e_r$ will take after the Nth maneuver is completed. A cusp 24 is displaced by the forced disturbance, as indicated by corresponding cusp 24'. It is the object of the invention to maintain the track of the final ellipse 22' within the constraint circle 12 at all times during the East/West stationkeeping cycle.

Among the parameters which are monitored during the control of the eccentricity are the magnitude and direction of the angle between the eccentricity vector, e, and the current line 14, 14' or 14". The initial angle is $\alpha_o$, the target angle is $\alpha_t$, and the final angle is $\alpha_f$. The final angle $\alpha_f$ is referenced to the final eccentricity vector and line 14". The sign of the angle indicates whether the eccentricity vector leads (positive) or lags (negative) line 14.

Maneuvers executed near the crossing of the semi-latus rectum (i.e., when true anomaly is at $\pm 90°$) will maximize the rotation of the eccentricity vector, e, relative to the Sun while minimizing the change in magnitude of the eccentricity vector. Maneuvers executed near or on the line of apsides (i.e., when true anomaly is at 0° or at 180°) will maximize the change in magnitude of e while minimizing the change in rotation. According to the invention, the maneuver strategy starts with perigee pointing in a direction generally towards the Sun in order to keep corrections to the magnitude of the eccentricity vector e small. Therefore, East/West stationkeeping maneuvers mainly take place near the crossing of the semi-latus rectum. In this way, the eccentricity vector, e, roughly tracks the Sun, and is made to librate about the Earth-Sun line, which is the basic idea behind the SPPS.

The maneuver sequence is initiated with the eccentricity vector, $e_o$, (FIG. 3) leading line 14 by angle $\alpha_o$. The total maneuvers comprising $\Delta e$ are performed to reset the target eccentricity vector $e_t$ to lag line 14 by angle $\alpha_t$. The effects of the solar radiation pressure and the luni-solar gravitational effects will naturally drive the eccentricity vector to $e_f$ at angle $\alpha_f$ line 14". The process is repeated to maintain the eccentricity vector e within the bounds $E_c$ of the circle of constraint 12. If eccentricity drifts outside of the circle of constraint 12, the daily longitude librations may exceed the deadband requirements. In accordance with the invention, the maneuvers take into account the time-dependent variations (24) on the eccentricity ellipse.

In order to prevent any one maneuver sequence from becoming too large, limits are placed on the amount of permissible change in the eccentricity vector. A coordinate system is selected which will rotate with the average Earth-Sun line (i.e., it will have a period of approximately one year). For a Sun Pointing Perigee Strategy, the coordinate system may be a Cartesian (x-y) coordinate system wherein the x direction (magnitude) is along the average Earth-Sun line (FIG. 4 and FIG. 5) and the y direction is in the orbit plane perpendicular to the Earth-Sun line. Changes in the x direction affect the approximate magnitude of the eccentricity vector, and changes in the y-direction affect the approximate rotation of the eccentricity vector. This coordinate system is interpreted in the above fashion only for non-zero eccentricity vectors that point in the general vicinity of the Sun; these conditions are appropriate for normal operational conditions.

Figure 4:
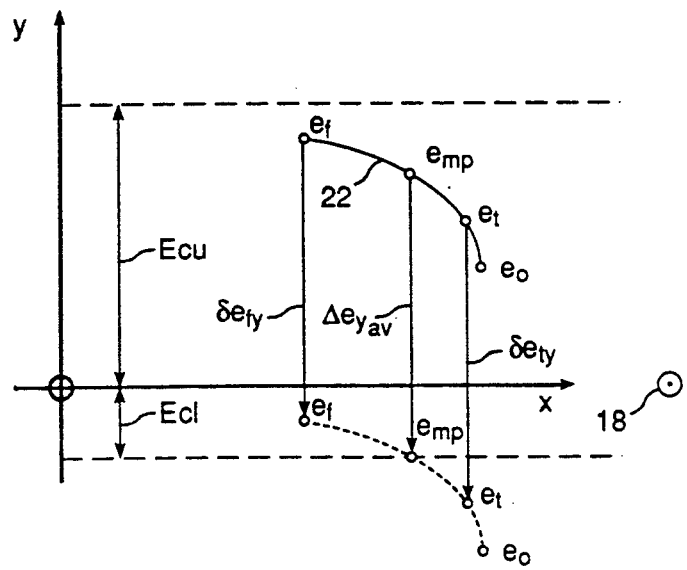
FIG. 4 is a diagram for illustrating change in eccentricity in the y-direction corresponding to a change in rotation.

Referring to FIG. 4, the two parameters that control the rotation of the eccentricity vector are $E_{cu}$ and $E_{cl}$, which relate to the eccentricity constraint value $E_C$. The parameter $E_{cu}$ places an upper limit on the amount that the eccentricity can be translated down relative to the selected coordinate system to the average Earth-Sun line and establishes the maximum rotation allowed. The parameter $E_{cl}$ is a bias off of the average Earth-Sun line which allows the method to slightly over target.

The average change in eccentricity needed to target the y-direction only is:

$$\Delta e_{yav} = \tfrac{1}{2}(\delta e_{yt} + \delta e_{yf}) \quad (1)$$

Thus, $\Delta e_{yav}$ is the change in eccentricity in the y direction from the initial ellipse 22 to the target ellipse projected in the y direction. By placing a limit on the amount the eccentricity is allowed to rotate in order to meet the target conditions, the expression for the y direction of the required change in eccentricity is:

$$\Delta e_y = MIN[MAX(-E_{cl}, \Delta e_{yav}), E_{cu}] + E_{cl} \quad (2)$$

This expression is illustrated graphically in FIG. 4.

Figure 5:
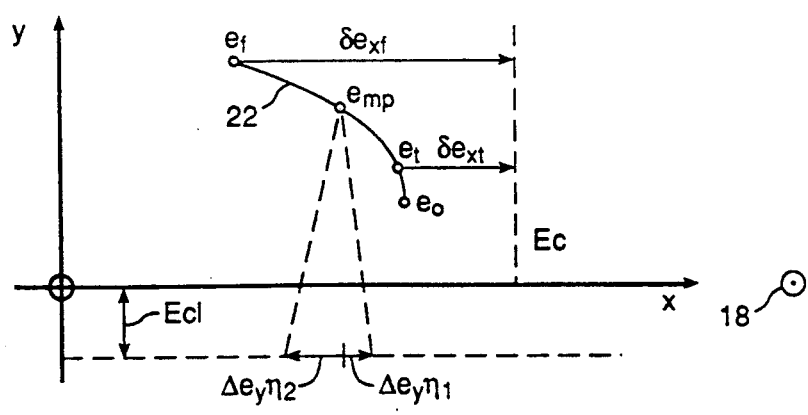
FIG. 5 is a diagram for illustrating a change in eccentricity in the x-direction corresponding to the change in magnitude.

FIG. 5 illustrates the change in eccentricity in the x-direction, corresponding to a change in magnitude. Shown are the eccentricity value at the midpoint of the free drift cycle, $e_{mp}$, the change in eccentricity vector at the beginning of the free drift cycle, $\delta e_{xt}$, the change in eccentricity vector at the final position $\delta e_{xf}$, and the scaled efficiency parameters $\eta_1$ and $\eta_2$. The change needed in the x-component of eccentricity is taken as the difference between the x-component of the eccentricity vector at the beginning of the free drift cycle or the x-component for the eccentricity vector at the end of the free drift cycle and the constraining value for eccentricity $E_c$ whichever is larger:

$$\Delta e_x = MAX(\delta e_{xt} - E_c, \delta e_{xf} - E_c) \quad (3)$$

The two efficiency parameters are introduced to control the change in magnitude of the eccentricity vector, these parameters are $\eta_1$ and $\eta_2$. Since it is more efficient to locate the maneuvers close to the semi-latus crossing, these two parameters bind the location of the firings near the perpendicular to the average Earth-Sun line. Therefore, the allowed change in the x-component of the eccentricity vector is:

$$\Delta e_x = MAX(-\eta_1 * \Delta e_y, MIN(\eta_2 * \Delta e_y, \Delta e_x)) \quad (4)$$

Note that the allowed change in the x-component of the eccentricity vector (measured in the rotating coordinate system which rotates with the average Earth-Sun line) is expressed as a function of the change in the y-component of eccentricity. This is to restrict the amount of $\Delta V$ that goes into changing the magnitude of eccentricity as opposed to changing its direction. Magnitude changes to eccentricity are inefficient, and therefore, are scaled by the rotation change.

Given the components for the change required in eccentricity that achieve the proper target conditions which will initiate a free drift cycle, the corresponding value of the change in velocity $\Delta V$ needed can be calculated by the square root of the sum of the squares of eccentricity components:

$$\Delta V_{ec} = \tfrac{1}{2} * V_s * SQRT(\Delta e_x^2 + \Delta e_y^2) \quad (5)$$

where $V_s$ is the orbital velocity at synchronous altitude. Finally, the location of the true anomaly for the first maneuver (with all subsequent maneuvers located no less than half a sidereal day apart) can be determined by locating the inertial angle for the change in eccentricity vector. The true anomaly, or angle in the orbit plane from the perigee, for the maneuver is located on the line parallel to the $\Delta e$ vector, noting that there are two solutions 180° apart. Care must be taken that the first maneuver is placed in the vicinity of the initial true anomaly provided to the East/West stationkeeping algorithm. The true anomaly $v_0$ can be taken as:

$$v_0 = arctan(\Delta e_y/\Delta e_x) - E_{SRA} \tag{6}$$

where $E_{SRA}$ is the angle between the average Earth-Sun line and the initial eccentricity vector.

The change in velocity $\Delta V_{ec}$ is subdivided in order to simultaneously control eccentricity and longitude. Since in general the change in velocity needed to control the eccentricity vector is not the same as the change in velocity needed to control longitude and drift rate, two or three maneuvers are typically required. If it is then desired to perform the stationkeeping maneuvers in the on-orbit, or momentum wheel, control mode, then the total change in velocity $\Delta V_{ec}$ required to control eccentricity may be further subdivided into a set of smaller $\Delta V_i$'s. These smaller $\Delta V_i$'s are chosen with attention to the sign (indicative of direction of thrust) relative to the orbital velocity. This is done in such a manner that total change in velocity allows eccentricity to achieve its target conditions.

Figure 6:
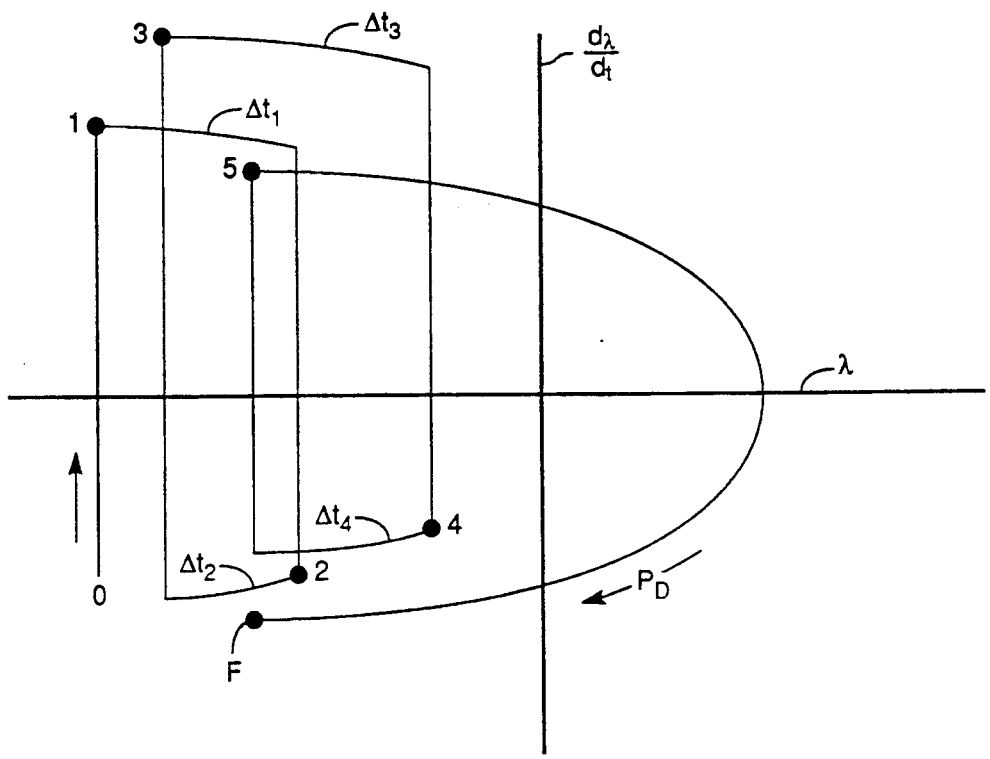
FIG. 6 is a drift rate versus longitude diagram for a five-maneuver, seven-day East/West drift cycle.
Figure 7:
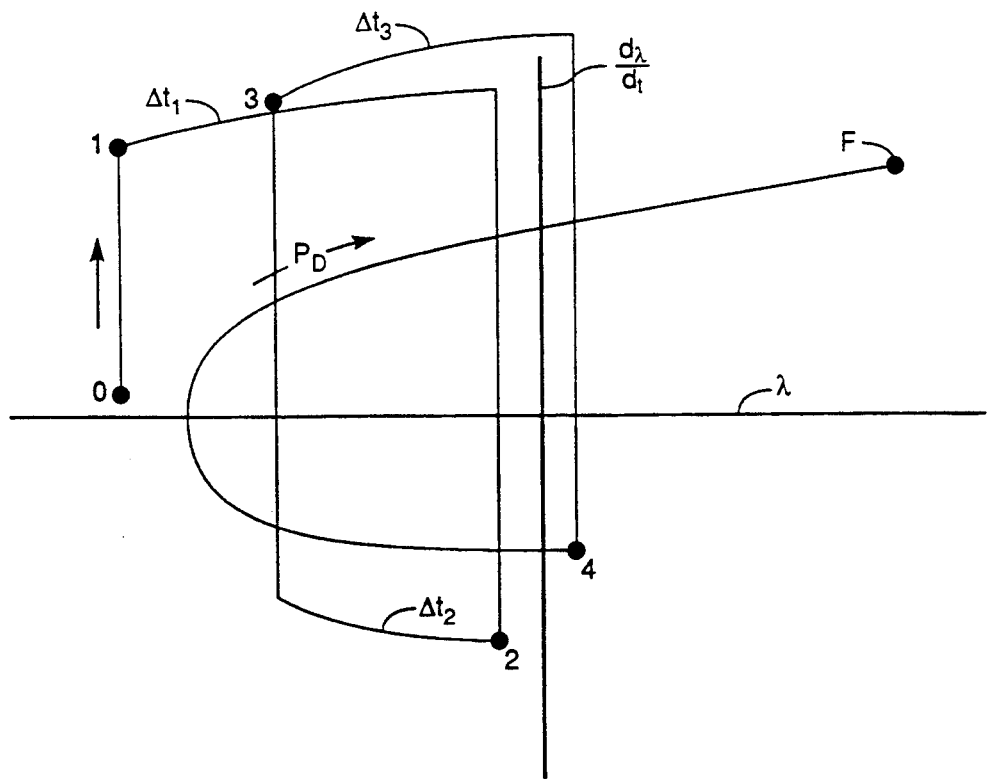
FIG. 7 is a drift rate versus longitude diagram for a four-maneuver, seven-day East/West drift cycle.

The other portion of the problem is determination of the target conditions for longitude and drift rate. It is essential to control longitude within the constraints of acceleration; it is important to recognize that acceleration will change in magnitude and may even change direction. FIGS. 6 and 7 are examples which illustrate the effects of $\Delta V$ maneuvers in the longitude and drift rate phase plane for two different initial conditions and different directions of longitudinal acceleration. FIG. 6 illustrates an odd-number of maneuvers, namely, a 5-maneuver, 7-day cycle, wherein the ordinate axis is drift rate in degrees (East) per day and the abscissa is longitude in degree (East) relative to a station location at the origin, and where the maneuvers are symmetric about each axis. Referring to FIG. 6, the time from point 0 to point F is the East/West stationkeeping period. The free drift period $P_D$ is the period from the completion of the last maneuver (point 5) to the final point F. In this example, the longitudinal acceleration is negative. The sum of the change in velocities for the five maneuver example is given by:

$$\Delta V_{ec} = -\Delta V_1 + \Delta V_2 - \Delta V_3 + \Delta V_4 - \Delta V_5 \tag{7}$$

where each $\Delta V_i$ carries its own sign.

The maneuvers are shown for the case where the total change in velocity to control eccentricity $\Delta V_{ec}$ is greater than the change in velocity to target longitude and drift rate $\Delta V_D$, as indicated by the alternating directions for the maneuvers shown in both FIG. 6 and FIG. 7. Otherwise, the maneuvers will not alternate direction if performed each ½ day.

The kinematic equation relating to the maneuvers of FIG. 6 is given by:

$$\lambda_N = \lambda_0 30 \ \Sigma d\lambda_i/dt^* \Delta t_i + \Sigma d^2\lambda_i/dt^{2*}(\Delta t_i^2)/2 \tag{8}$$

where the summations $\Sigma$ are from $i=0$ to $i=N-1$ except as noted otherwise hereinafter; for example $N=5$; and $\lambda$ is longitude, its first derivative with respect to time $d\lambda/dt$ is the longitudinal rate and its second derivative $d^2\lambda/dt^2$ is the drift acceleration. The time $\Delta t_i$ is nominally ½ day between maneuvers, but may be integer multiples of ½ day.

The above equation can be rearranged to place all unknowns on one side of the equation and to allow the equation to be expressed more conveniently in matrix form:

$$-\lambda_N + \Sigma d\lambda_i/dt^* \Delta t_i = -\lambda_0 - \Sigma d^2\lambda_i/dt^{2*}(\Delta t_i^2)/2 \tag{9}$$

where the unknowns are all placed on the left-hand side of the equation.

The unknowns in matrix form for the $N=5$ example are thus:

$$X = [\lambda_5, \ d\lambda_1/dt, \ d\lambda_2/dt, \ d\lambda_3/dt, \ d\lambda_4/dt, \ d\lambda_5/dt] \tag{10}$$

where the target longitude is $\lambda_5$, the target drift rate is $d\lambda_5/dt$ and the intermediate drift rates are $d\lambda_1/dt$, $d\lambda_2/dt$, $d\lambda_3/dt$ and $d\lambda_4/dt$.

Shaping parameters may be introduced to control the relative magnitudes of the intermediate longitudes $\lambda_i$ and drift rates $d\lambda_i/dt$ between successive maneuvers. Rewriting Equation (9) yields:

$$\Sigma d\lambda_i/dt^* \Delta t_i = \Delta \lambda_D \Sigma \gamma_i - \Sigma d^2\lambda_i/dt^{2*}(\Delta t_i^2)/2 \tag{11}$$

$$\text{where: } \Sigma \gamma_i = 1, \text{for } i=1 \text{ to } N-1 \tag{12}$$

which represents the shaping parameters.

Re-expressing Equation 7 in terms of sums of drift rates and rearranging to place all unknowns on one side of the equation yields:

$$2\Sigma(-1)^i d\lambda_i/dt + (-1)^N d\lambda_n/dt = \tag{13}$$
$$= 6\pi\beta/(T_S^* V_S)|\Delta V_{ec}| - \Sigma(-1)^i d^2\lambda_i/dt^{2*}(\Delta t_i)$$

where $T_s$ is the ratio of the sidereal day to the solar day;

$V_s$ is the synchronous (two body) velocity; and $\beta$ is the sign $(+/-)$ used to keep track of the direction of the change of velocity.

The foregoing equations may be expressed in matrix form for any number of maneuvers. In a system having dual axis symmetry as in FIG. 6, an odd or even number of maneuvers can be required. An odd number of maneuvers assures dual axis symmetry. The foregoing equations may be expressed in matrix form as follows:

$$Ax = B \tag{14}$$

$$A = \begin{bmatrix} 0 & -2 & 2 & -2 & 2 & -1 \\ 0 & 0 & 0 & 0 & 0 & 1 \\ -1 & \Delta t_1 & \Delta t_2 & \Delta t_3 & \Delta t_4 & 0 \\ -(\gamma_1 + \gamma_2) & \Delta t_1 & \Delta t_2 & 0 & 0 & 0 \\ -(\gamma_2 + \gamma_3) & 0 & \Delta t_2 & \Delta t_3 & 0 & 0 \\ -(\gamma_3 + \gamma_4) & 0 & 0 & \Delta t_3 & \Delta t_4 & 0 \end{bmatrix} \tag{15}$$

$$X = \begin{bmatrix} \lambda_5 \\ d\lambda_1/dt \\ d\lambda_2/dt \\ d\lambda_3/dt \\ d\lambda_4/dt \\ d\lambda_5/dt \end{bmatrix} \tag{16}$$

-continued $$B = \begin{bmatrix} 6\pi\beta/(T_S{}^*V_S)|\Delta V_{ec}| - \Sigma(-1)^i d^2\lambda_i/dt^{2*}(\Delta t_i) - d\lambda_0/dt \\ -\frac{1}{2}(^2\lambda/dt^2)_D \\ -\lambda_0 - \frac{1}{2}\Sigma d^2\lambda_i/dt^2\Delta t_i (i = 1,4) \\ -\lambda_0(\gamma_1 + \gamma_2) - \frac{1}{2}(d^2\lambda_1/dt^2\Delta t_1{}^2 + d^2\lambda_1/dt^2\Delta t_2{}^2) \\ -\lambda_0(\gamma_2 + \gamma_3) - \frac{1}{2}(d^2\lambda_2/dt^2\Delta t_2{}^2 + d^2\lambda_3/dt^2\Delta t_3{}^2) \\ -\lambda_0(\gamma_3 + \gamma_4) - \frac{1}{2}(d^2\lambda_3/dt^2\Delta t_3{}^2 + d^2\lambda_4/dt^2\Delta t_4{}^2) \end{bmatrix} \quad (17)$$

FIG. 7 shows a diagram of maneuvers in the longitude and drift rate phase plane for a 4-maneuver example, 7-day cycle. The ordinate is drift rate in degrees (East) per day and the abscissa is longitude is in degree (East) relative to a station longitude located at the origin. Note, the maneuvers are symmetric about only the drift axis example and the longitudinal acceleration is positive.

Equation (18) guarantees symmetry about the drift rate axis ($\lambda_{TA} = -\lambda_F$):

$$2\lambda_N + d\lambda_N/dt^*(P_D + \tau) = -d\lambda_N{}^2/dt^{2*}(P_D{}^2 + \tau^2)/2 \quad (18)$$

where $P_D$ is the free drift period, $\tau$ is the time required to transition from target conditions to turnaround conditions ($\lambda_{TA}$), $d\lambda_N/dt$ is the target drift rate and $d\lambda_N{}^2/dt^2$ is the mean daily acceleration averaged over the free drift cycle.

The free drift period $P_D$ is the period from the completion of the last maneuver (point 4) to the final point F. The sum of the change in velocities for the four maneuvers is given by:

$$\Delta V_{ec} = -\Delta V_1 + \Delta V_2 - \Delta V_3 + \Delta V_4 \quad (19)$$

where each $\Delta V_i$ carries its own sign. In this case wit single axis symmetry, the matrix equations for the target longitude $\lambda_F$ are given as follows:

$$Ax = B \quad (20)$$

where $$A = \begin{bmatrix} 0 & -2 & 2 & -2 & 1 \\ 2 & 0 & 0 & 0 & P_D + \tau \\ -1 & \Delta t_1 & \Delta t_2 & \Delta t_3 & 0 \\ -(\gamma_1 + \gamma_2) & \Delta t_1 & \Delta t_2 & 0 & 0 \\ -(\gamma_2 + \gamma_3) & 0 & \Delta t_2 & \Delta t_3 & 0 \end{bmatrix} \quad (21)$$

$$x = \begin{bmatrix} \lambda_4 \\ d\lambda_1/dt \\ d\lambda_2/dt \\ d\lambda_3/dt \\ d\lambda_4/dt \end{bmatrix} \quad (22)$$

$$B = \begin{bmatrix} 6\pi\beta/(T_S{}^*V_S)|\Delta V_{ec}| - \Sigma(-1)^i d^2\lambda_i/dt^{2*}(\Delta t_i) - d\lambda_0/dt \\ -\frac{1}{2}d^2\lambda_N/dt^2(P_D{}^2 + \tau^2) \\ -\lambda_0 - \frac{1}{2}\Sigma d^2\lambda_i/dt^2\Delta t_i (i = 1,4) \\ -\lambda_0(\gamma_1 + \gamma_2) - \frac{1}{2}(d^2\lambda_1/dt^2\Delta t_1{}^2 + d^2\lambda_1/dt^2\Delta t_2{}^2) \\ -\lambda_0(\gamma_2 + \gamma_3) - \frac{1}{2}(d^2\lambda_2/dt^2\Delta t_2{}^2 + d^2\lambda_3/dt^2\Delta t_3{}^2) \end{bmatrix} \quad (23)$$

In order to execute the desired maneuvers, the following inputs are needed:
Cycle length (in days, such as 7 or 14);
Station longitude;
A table of unperturbed eccentricity components ($e_x, e_y$) subject to solar radiation pressure, Earth gravitational effects and the luni-solar gravitational effects;
A table of unperturbed longitudes and drift rates (in the absence of maneuvers), subject to the Earth's gravitational effects and the luni-solar effects;
Initial true anomaly in the approximate location of the first maneuver ($v_0$);
Initial mean daily longitude and means daily drift rate.

Longitudinal acceleration is not constant over the free drift period so that symmetry about the drift rate axis (FIG. 6 or FIG. 7) cannot be achieved in reality. Because the longitudinal acceleration is not constant it is averaged again over the period of free-drift cycle. By doing so, off-line iterations by an operator to account for luni-solar effects in the targeting scheme are not required, as the technique described above produces very accurate results without operator intervention.

These functions, called eccentricity targeting and longitude and drift rate targeting, are implemented by way of example in a digital computer executing the programs EWMNVR and ECNSTR disclosed in Appendix A attached hereto. The subroutine ECNSTR is called by EWMNVR. It determines the change in velocity required for eccentricity to achieve its target conditions which will maintain eccentricity below its constraint value for the entire East/West cycle time and calculates the exact time of the first maneuver. It also provides the true anomaly for the first maneuver (which is converted into time of the first maneuver).

Figure 8:
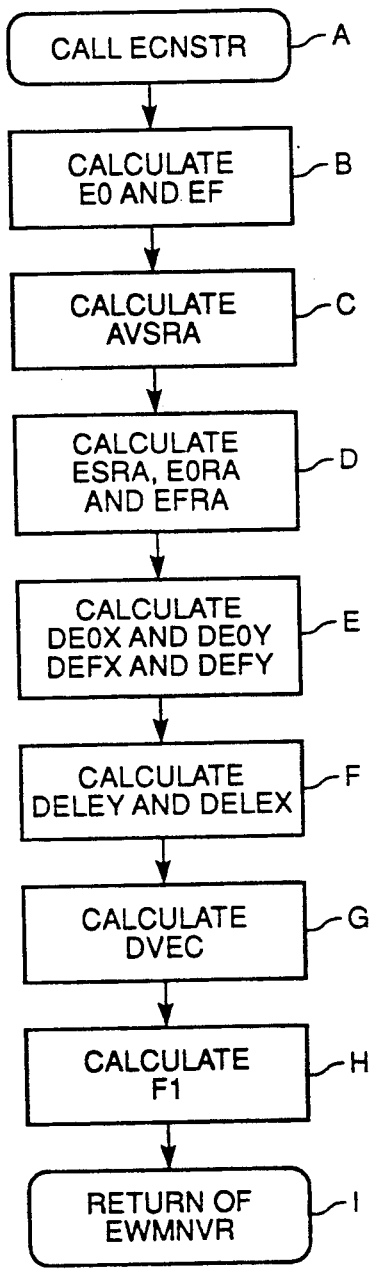
FIG. 8 is a flowchart illustrating a method for controlling eccentricity in accordance with the invention.

FIG. 8 is a flow chart for ECNSTR. Called from EWMNVR (Step A), ECNSTR calculates the unperturbed eccentricity magnitude at the beginning and end of the East/West cycle (E0, EF) (Step B), then calculates the Average Right Ascension of the Sun over the free drift cycle (AVSRA) (Step C). Thereafter it calculates the right ascension of the eccentricity vector at the beginning of the free drift cycle and at the end of the free drift cycle (E0RA, EFRA) (Step D), then it calculates the projection of the eccentricity vector onto the Average Sun-Line at the beginning of the free drift cycle and at the end of the free drift cycle (DE0X, DE0Y, DEFX, DEFY) (Step E), and then calculates the change in the eccentricity vector required to meet targeting constraints (DELEY and DELEX), restricting the change to values dictated by $\eta_1$ and $\eta_2$ (EFF1 and EFF2) in the x-direction and EUPL and ELWL in the y direction (Step F). It then calculates the change in velocity (DVEC), determining it from the required change in eccentricity (Step G). Finally, it calculates the true anomaly of the first maneuver (Fl) based on the location of the initial eccentricity, located in the same half plane (Step H) before returning to the calling program (Step I).

The above technique is intended to provide East/West stationkeeping within the maximum value of its constraint with a minimal expenditure of propellant and no off-line operator intervention. It is not suitable for station acquisition. It takes into account the constraints on eccentricity and size of the longitude deadband. Whereas previous techniques have attempted to lump many of the uncertainties into the deadband, the present invention takes some of these into account, such as the luni-solar effects, in order to reduce fuel usage.

The invention has now been explained with reference to specific embodiments. Other embodiments will be apparent to those of ordinary skill in the art. It is therefore not intended that the invention be limited except as indicated by the appended claims.

APPENDIX A

```
      SUBROUTINE EWMNVR(YR,DY,NMAN,EWPER,STALON,DLAM,DLAMD,EMARG,
     &     EFF1,EFF2,EUPL,EULL,EX,EY,L,TA,STEPF,STEPR,DELV)
C     _____
C          EAST-WEST STATIONKEEPING MANEUVER PLANNING ALGORITHM
C     _____
C
C     Program Description
C     Sizes the delta-V's for the N-maneuvers required to perform simultaneous
C     drift-rate and eccentricity control subject to the following constraints.
C        1. Burn Duration Limitations corresponding to
C             - BOL (beginning of life)
C             - NOM (nominal)
C             - EOL (end of life)
C        2. Longitudinal Dead-band
C        3. East-West Stationkeeping Period
C     The number of maneuvers may change from the user specified value subject
C     to compatibility with geometric constraints and limitations on the burn
C     duration (for wheel mode operations).
C
C     Inputs are considered to be mean elements
C     Units are in radians, radians/day, and meters
C
C
      IMPLICIT REAL*8(A-H,O-Z),INTEGER*4(I-N)
      COMMON /SYNC/   ASYNC,VSYNC,TSYNC,
     &       /ADJUST/ N,NM1,DT,TIME(20),DV(20),BURNT(20,3),IOVBRN,F1,
     &       /SPECS/  EWPD,PD,DVEC,EMAR,EMAX,PSI,RM,
     &       /EPOCH/  DAY0,YEAR,XJD,
     &       /MOTION/ XLAM0,XLAMD0,XLAMS,XLAM(20),XLAMD(20),XLAMDD(20),
     &       /DATAD/  PI,TWOPI,RADDEG,
     &       /EWPRT/  IPRNT,EDV
C
      DIMENSION DELV(20),DLAM(L),DLAMD(L),EX(L),EY(L),XLAMX(20)
      DIMENSION GAMMA(20),A(20,20),B(20),IWORK(20),SWORK(20)
C
C     DLAM and DLAMD are the average values for longitude relative to the
C     station location and drift rate over the propagated free drift cycle
C     EX and EY are the average values for eccentricity components over
C     the free drift cycle.
C
C     Open primary EWMNVR output file
      OPEN(6,FILE='EWMNVR.OUT')
C     Conversion factors
      PI     = DACOS(-1.D0)
      TWOPI  = 2.D0*PI
      RADDEG = PI / 180.D0
C
      SIDDAY = 86164.0905D0
      SOLDAY = 86400.D0
      GM     = 3.9860044D+14
C
C     Rotation rate of Earth expressed in radians per solar day
      WE     = TWOPI * SOLDAY / SIDDAY
C     Calculate Kepler synchronous semi-major axis and velocity
      ASYNC  = (GM / (WE/SOLDAY)**2)**(1.D0/3.D0)
      VSYNC  = ASYNC*WE/SOLDAY
      TSYNC  = SIDDAY/SOLDAY
C     _____
C
C     Input parameters
C     Calender Year
      YEAR   = YR
C     Day from January 1
```

```
              DAY0    = DY
C     Desired number of maneuvers
              N       = NMAN
C     Total time for maneuver scenario (including maneuvers)
C     Half a day is added to the maneuver cycle time to ensure
C     overlap in the determination of consistent initial conditions
              EXPD    = EXPER  + .5D0
C     Station longitude
              XLAMS   = STALON
C     Longitude deviation from station longitude
              XLAM0   = DLAM(1)
C     Drift rate in rad/day
              XLAMD0  = DLAMD(1)
C     Half of total dead band to be used (excludes uncertainties)
              EMAR    = EMARG
C     True anomaly input should be consistent with initial geometry
C     output over writes the input and is location of first maneuver
              F1      = TA
C     Longitude Control parameters. PSI is the sizing parameter
C     which determines the relative sizes of each successive
C     set of maneuvers (height).  RM is the rate at which the drift
C     rate approaches the target conditions (width).
              PSI     = STEPF
              RM      = STEPR
C     Hard dead band for longitude in radians
              XLONDV  = .05D0*RADDEG
C
C-------------------------------------------------------------
C
C     Epoch day (units of solar days since start of epoch year)
C     Examples:
C             0-hours Jan 1, YEAR=1989 --> DAY0 = 0.0
C             12-noon Jan 1, YEAR=1990 --> DAY0 = 0.5
C             0-hours Jan 2, YEAR=1991 --> DAY0 = 1.0
C             12-noon Jan 2, YEAR=1992 --> DAY0 = 1.5
C     Constant time between maneuvers of half a sidereal day
              DT      = .5D0*TSYNC
              EXPD    = DMIN1(EXPD,35.D0)
C
C     Determine epoch right ascension of satellite (XJD0 is the Julian Day
C     corresponding to 12-noon 1 Jan 1900, i.e., 0.5 days into the year 1900)
              XJD0    = 2415020.D0
              XJD     = XJD0 + 365.D0*(YEAR - 1900.D0) +
     &                  DINT( (YEAR - 1901.D0) / 4.D0 ) + .5D0 + DAY0
C
C     Beta flag is used in identifying the initial geometry
              BETA    = SIGN(1.,DSIN(-F1))
C
C     <<<<<<<<<<<<<<<<<<<<<<<<<<<<<<<<>>>>>>>>>>>>>>>>>>>>>>>>>>>>>>>>
C
   30         NMAN    = N
              LIMIT   = MIN( 16, 2*NINT(EXPD) - 4 )
              IF ( N .GE. LIMIT ) RETURN
C
C     Calculate maneuver times and duration of free drift period (solar days)
              PD      = EXPD - DELE(N-1)*DT
              DO 40 I = 1, N
   40         TIME(I) = DAY0 + DELE(I-1)*DT
              TIME(N+1) = DAY0 + EXPD
C
C     Calculate the average of the mean-daily longitudinal acceleration for the
C     intermediate drift durations and for the free-drift period
C     DLAM and DLAMD are sent in 1/2 day increments
              DO 50 K1 = 1, N-1
                 K2      = K1 + 2
   50         XLAMDD(K1) = AVGMD( 2.D0*DT,DLAM,DLAMD,K1,K2,L )
```

```
C       Free drift period
        K1       = N
        K2       = MIN( (K1+NINT(2*PD)) ,L)
        XLAMDD(N) = AVGMD( PD,DLAM,DLAMD,K1,K2,L )
C
C       Flag to carry the sign of the mean longitudinal acceleration
        CETA     = -SIGN( 1.D0, XLAMDD(N) )
C
C   .. Compute Delta-Vec for eccentricity control and correct the true anomaly
C       of the first burn (subsequent burns are spaced in time by DT)
        CALL ECNSTR( EX,EY,EFF1,EFF2,EXPL,EIWL,L,BETA )
C
C       Delta-V used for input into main program
        EDV = DVEC
C
C       Longitude Soft Dead Band at desired turn around conditions
C       Hard dead band minus maximum eccentricity
C       Allow softdead band longitude to carry its own sign
        DELSDB = DABS( XLONDV - 2.D0*EMAX ) * CETA
C
C       Set time of zero drift rate crossing, initial guess for "drop in"
C       Start with symmetric conditions and iterate TAU which is the time until
C       turnaround or drift rate equal to zero.  Initial guess.
        TAU = .5D0*PD
C
        NP1 = N + 1
        NM1 = N - 1
C
C       <<<<<<<<<<<<<<<<<<<<<<<<<<<<<<<<<<<<>>>>>>>>>>>>>>>>>>>>>>>>>>>>>>>>>>>>
C
C               Construct components to the equation: [A]X̄ = B̄
C
C       <<<<<<<<<<<<<<<<<<<<<<<<<<<<<<<<<<<<>>>>>>>>>>>>>>>>>>>>>>>>>>>>>>>>>>>>
        NCONT = 0

C       Determine weighting parameters for control cycle shaping
        IMAX    = (N - 2) / 2
        SIGMA1  = 1.D0
        DO 80 I = 1, IMAX
  80    SIGMA1  = SIGMA1 + RM**I IMAX    = (N - 3) / 2
        SIGMA2  = 1.D0
        DO 90 I = 1, IMAX
  90    SIGMA2  = SIGMA2 + RM**I GAMMA(1) = 1.D0 / (SIGMA1 - PSI*SIGMA2)
        GAMMA(2) = -PSI*GAMMA(1)
        DO 100 I = 3, NM1
        GAMMA(I) = RM*GAMMA(I-2)
 100    CONTINUE
C
C       Load the constraint vector B
        SUM1 = 0.D0
        SUM2 = 0.D0
        DO 110 I = 1, NM1
            SUM1 = SUM1 + XLAMDD(I)*((-1.D0)**I)
 110        SUM2 = SUM2 + XLAMDD(I)
C
C       Count number of interation
 115    NCONT = NCONT + 1

IF ( NCONT .GT. 10) THEN
            N = N + 1
                WRITE(*,'(//,A39,/,A36,I3,/,A39,/,A39,//)')
```

```
          &                   '****************************************',
          &                   ' Number of Maneuvers Incremented to ',N,
          &                   '    to Satisfy Dead Band Constraints    ',
          &                   '****************************************'
                GO TO 30
              ENDIF
C
C      Difference between mean-daily target longitude and the initial mean-daily
C      longitude, initial guess for "drop in" solution.
C
C      *** Element 1 ***
              B(1) = (6.D0*PI*BETA/(TSYNC*VSYNC))*DVEC - DT*SUM1 - XLAM0
C      *** Element 2 ***
              B(2) = -0.5D0 * XLAMDX(N) * (PD**2 + TAU**2)
C      *** Element 3 ***
              B(3) = -XLAM0/DT - .5D0*DT*SUM2
C      *** Remaining Elements ***
              IF (N .GT. 2) THEN IF ((N/2)*2 .EQ. N) THEN
C      If number of maneuvers is even
                    L2 = N - 2
                    L3 = 3
                ELSE
C      If number of maneuvers is odd
                    B(4)  = -XLAMDX(N) * TAU
                    L2 = N - 3
                    L3 = 4
                ENDIF DO 120 I = 1, L2
  120           B(I+L3) = (-XLAM0/DT)*( GAMMA(I) + GAMMA(I+1) ) -
          &              .5D0*DT*( XLAMDX(I) + XLAMDX(I+1) )
C
              ENDIF
C      Load the non-zero elements of the N x N matrix [A]
              DO 140 I = 1, N+1
              DO 140 J = 1, N+1
  140           A(I,J) = 0.D0
C
C      *** First row ***
              DO 150 J = 2, N
  150           A(1,J)   = 2.D0*((-1.D0)**(J-1))
                A(1,N+1) = (-1.D0)**N
C      *** Second row ***
                A(2,1)   = 2.D0
                A(2,N+1) = PD + TAU
C      *** Third Row ***
                A(3,1)   = -1.D0/DT
              DO 160 I = 2, N
  160           A(3,I)   = 1.D0
C      *** Remaining Rows ***
C      If number of maneuvers is odd will have symmetric cycle
              IF ((N/2)*2 .NE. N) THEN
                  A(4,N+1) = 1.D0
              ENDIF
              L4 = L3 + 1
              DO 170 J = 1, L2
                  A(L4,1)   = (-1.D0/DT)*( GAMMA(L4-L3) + GAMMA(L4-L3+1) )
                  A(L4,J+1) = 1.D0
                  A(L4,J+2) = 1.D0
  170           L4 = L4 + 1
C
C      Solve the system of linear equations: [A]X=B
C      (note,matrix [A] and vector B are destroyed)
  180         CALL GAUSSJ(A,DET,20,N+1,IWORK,SWORK)
              CALL SOLVE(A,20,N+1,IWORK,B,XLAMX)
C
```

```
C       Load target longitude and intermediate drift rates
        XLAM(N)  = XLAMX(1)
        DO 190 I = 1, N
            XLAMD(I) = XLAMX(I+1)
190 CONTINUE
C
C       Set target conditions
        XLAMT  = XLAM(N)
        XLAMDT = XLAMD(N)
C
C       Compute intermediate longitudes based on intermediate drift rates
C       Note that XLAM(N) is also computed here
        XLAM(1) = XLAM0
        DO 220 K = 1, N-1
220     XLAM(K+1) = XLAM(K) + XLAMD(K)*DT + .5D0*XLAMDD(K)*DT**2
C
C       Check for convergence on TAU based on intermediate values
        TAUOLD = TAU
C      "Update turn around time
C       TAU    = DSQRT( 2.D0 *DABS((XLAM(N) - XLAMTA)/XLAMDD(N)))
        TAU    = -XLAMDT / XLAMDD(N)

C       Update turn around conditions based on target conditions
        XLAMTA = XLAMT + XLAMDT*TAU + .5D0*XLAMDD(N)*TAU**2

C
        EPS    = DABS(TAUOLD - TAU)
        IF ( EPS .GT. 0.01 ) GO TO 115
C
        IF ( DABS(XLAMTA) .GT. DABS(DELSDB) .OR.
     &          SIGN(1.D0,XLAMTA*CETA) .LT. 0.D0 ) THEN
            N = N+1
        ENDIF

IF ( N .NE. NMAN ) GO TO 30
C
C
        WRITE(6,1117) N
1117 FORMAT(' *** ',I2 )
C
C       Compute final longitude and drift rate
        XLAM(N+1)  = XLAM(N) + XLAMD(N)*PD + .5D0*XLAMDD(N)*PD**2
        XLAMD(N+1) = XLAMD(N) + XLAMDD(N)*PD
C
C       Compute the corresponding delta-V's and thrust burn times for all three
C       phases of the satellite's life
        CALL DELTAV
        CALL DELTAT
C
C       Sum the delta-V's (as a check) and burn times
        DVSUM  = 0.D0
        BRNSM1 = 0.D0
        BRNSM2 = 0.D0
        BRNSM3 = 0.D0
        DO 250 I = 1, N
            DVSUM  = DVSUM + DABS(DV(I))
            BRNSM1 = BRNSM1 + BURNT(I,1)
            BRNSM2 = BRNSM2 + BURNT(I,2)
250         BRNSM3 = BRNSM3 + BURNT(I,3)
C
C       If thruster constraints are violated increment number of maneuvers by 1
C       and loop back
        IF (IOVBRN .EQ. 0) GO TO 255
        N = N + 1
        WRITE(*,'(/,A39,/,A39,/,A36,I3,/,A39,//)')
```

```fortran
     &                 '****************************************',
     &                 '       Thruster Constraints Violated    ',
     &                 ' Number of Maneuvers Incremented to ',N,
     &                 '****************************************'
       GO TO 30
C
C      Calculate the approximate change in the eccentricty vector orientation and
C      its magnitude generated by the maneuver strategy
  255  CONTINUE
C
       NMAN = N
       TA   = F1
       DO 260 K = 1, N
          DELV(K) = DV(K)
  260  CONTINUE
C
C      Output summary
       IF ( IPRNT .EQ. 1 ) THEN
       CALL PLTFIL WRITE(6,1600) XLAMS/RADDEG,TAU,DELSDB/RADDEG,
     &               DVEC,XLAMT/RADDEG
 1600  FORMAT(' --- Intermediate Computations ---',/,
     &' Station longitude           = ',1PD20.13,            /,
     &' Partial cycle time: TAU     = ',1PD20.13,            /,
     &' Longitude Soft Dead Band    = ',1PD20.13,' (degrees)',/,
     &' Delta-Vec                   = ',1PD20.13,' (m/sec)  ',/,
     &' Target Mean Longitude       = ',1PD20.13,' (degrees)',/)

WRITE(6,1700)
 1700  FORMAT(///,T3,123('-'),/,T30,'Longitudinal Motion',
     &T83,'Burn Duration per Delta-V',/,
     &T3,'Index',T11,'Time',T21,'Longitude',T34,'Drift Rate',
     &T47,'Acceleration',T63,'Delta-V',T89,'(milliseconds)',
     &T114,'True Anomaly',/,
     &T5,'i',T10,'(days)',T21,'(degrees)',T35,'(deg/day)',
     &T47,'(deg/day**2)',T61,'(meters/sec)',
     &T80,'BOL',T94,'NOM',T107,'EOL',T116,'(degrees)',/,T3,123('-'))

WRITE(6,1810)0,0.D0,XLAM0/RADDEG,XLAMD0/RADDEG,F1/RADDEG

DO 210 I=1,N
  210     WRITE(6,1820)I,TIME(I)-DAY0,XLAM(I)/RADDEG,XLAMD(I)/RADDEG,
     &                 XLAMDD(I)/RADDEG,DV(I),(BURNT(I,K),K=1,3)
 1810  FORMAT(2X,I3,1X,1PD10.3,2(1X,1PD13.6),71X,1PD10.3)
 1820  FORMAT(2X,I3,1X,1PD10.3,7(1X,1PD13.6))
       WRITE(6,1850)NP1,TIME(NP1)-DAY0,XLAM(NP1)/RADDEG,XLAMD(NP1)/RADDEG
 1850  FORMAT(2X,I3,1X,1PD10.3,2(1X,1PD13.6))
       WRITE(6,1900)DVSUM,BRNSM1,BRNSM2,BRNSM3
 1900  FORMAT(T3,123('.'),/,T3,'Sum',T59,4(1X,1PD13.6),/,
     &       T3,123('-'))
 2100  FORMAT(3(1X,1PE20.13))
       ENDIF
       RETURN
       END

REAL*8 FUNCTION AVGMD(DELT,DLAM,DLAMD,I,K,L)
C
C.     Compute average of the long-period longitudinal acceleration due to
C      gravitational attraction of the Sun, Earth, and Moon across the time
C      interval [T1,T2]. Time zero corresponds to the epoch time.
C
       IMPLICIT REAL*8(A-H,O-Z),INTEGER*4(I-N)
       DIMENSION DLAM(L),DLAMD(L)
C      Units are in radians/day**2
C
C      Longitudinal acceleration is determined by differentiating
C      a quadratic approximation to the unperturbed motion provided
C      by numerical averaging.
```

```
C       AVGMD = 2.D0*( DLAM(K) - DLAM(I) - DELT*DLAMD(I) ) / DELT**2
        RETURN
        END

SUBROUTINE ECNSTR( EX,EY,EFF1,EFF2,EUPL,ELWL,L,BETA )
        IMPLICIT REAL*8(A-H,O-Z),INTEGER*4(I-N)
        DIMENSION EX(L),EY(L),S(3)

C       Determine the tangential delta-Vec required to rotate the eccentricity
C       vector (by the necessary amount) and the true anomaly for firing whereby
C       its magnitude is reduced to EC (the circular constraint value).
C       EFF1 AND EFF2 are efficiency control parameters pertaining to the
C       location of the maneuvers relative to the true anomaly. The closer
C       the maneuver is the true anomaly of 270 or 90 degrees, the more
C       the eccentricity vector is simply rotated, and the more efficient
C       maneuver. EUPL and ELWL are the upper and lower limits eccentricity
C       is allowed to vary per maneuver sequence. The lower limit produces
C       a minimum size burn and forces eccentricity to rotate in the desired
C       direction only. The upper limit prevents too large a change in
C       eccentricity per maneuver sequence.
C
        COMMON /SYNC/    ASYNC,VSYNC,TSYNC,
       &       /ADJUST/  N,NM1,DT,TIME(20),DV(20),BURNT(20,3),IOVBRN,F1,
       &       /SPECS/   EWPD,PD,DVEC,EMAR,EMAX,PSI,RM,
       &       /EPOCH/   DAY0,YEAR,XJD,
       &       /DATAD/   PI,TWOPI,RADDEG,
       &       /EWPRT/   IPRNT,EDV
C
C       Eccentricity constraint dependent only on eccentricity margin
        EC    = .5D0 * EMAR
C       Initial mean eccentricity (DAY0)
        E     = DSQRT( EX(1)**2 + EY(1)**2 )
C
C       Eccentricity at the beginning of free drift cycle (T0)
        T0    = DAY0 + DT*DBLE(N-1)
        E0    = DSQRT( EX(N-1)**2 + EY(N-1)**2 )

C       Eccentricity at the end of the free drift cycle (TF)
        TF    = DAY0 + EWPD
        EF    = DSQRT( EX(L)**2 + EY(L)**2 )
C
C       The average right ascension of the Sun through the free drift cycle
        SDATE = XJD + .5D0*( EWPD + DT*DBLE(N-1) )
        CALL SUN( SDATE, S )
        AVSRA = DATAN2( S(2), S(1) )
C
C       Right ascension of initial eccentricity vector
        ERA   = DATAN2( EY(1), EX(1) )
C       Angle between average Sun-line and the initial eccentricity vector
        ESRA  = ERA - AVSRA
        ESRA  = DMOD( ESRA + 3.D0*PI, TWOPI ) - PI
C
C       Right ascension of the eccentricity vector at the beginning of the
C       free drift cycle
        B0RA  = DATAN2( EY(N-1), EX(N-1) )
C       Angle between average Sun-line and the eccentricity vector at
C       the beginning of the free drift cycle
        E0SRA = B0RA - AVSRA
        E0SRA = DMOD( E0SRA + 3.D0*PI, TWOPI ) - PI
C
C       Right ascension of the eccentricity vector at the end of the
C       free drift cycle
        EFRA  = DATAN2( EY(L),EX(L) )
C       Angle between average Sun-line and the final eccentricity vector
        EFSRA = EFRA - AVSRA
```

```
          EFSRA  = DMOD( EFSRA + 3.D0*PI, TWOPI ) - PI
C
C     Projection of the eccentricity vector at the beggining of the
C     free drift period onto the average Sun-line
      DEOX   = E0*DCOS( E0SRA )
      DEOY   = E0*DSIN( E0SRA )
C
C     Projection of the final eccentricity vector onto average Sun-line
      DEFX   = EF*DCOS( EFSRA )
      DEFY   = EF*DSIN( EFSRA )
C
C     Determine the change in eccentricity needed to meet the constraints
      DELEY  = .5D0 * ( DEOY + DEFY )
      DELEY  = MIN( MAX( -ELWL, DELEY ), EUPL ) + ELWL
C
      DELEX  = MAX( DEOX - EC, DEFX - EC )
      DELEX  = MAX( -EFF1 * DELEY, MIN( EFF2 * DELEY, DELEX ) )
C C     Delta-V required to change eccentricity only
      DVEC   = .5D0 * VSYNC * DSQRT( DELEX2 + DELEY2 )
C
C     Determine the true anamoly for the first maneuver relative to the
C     initial eccentricity
      TAF    = DATAN2( DELEY + 1.D-7, DELEX ) - ESRA
      HEM    = PI + BETA * .5D0*PI
      F1     = MOD( TAF - HEM + 4.5D0*PI, PI ) - .5*PI + HEM
C
C     Determine the right ascension of the Sun at the beginning of the
C     free drift cycle
      CALL SUN( XJD+DT*DBLE(N-1), S )
      SORA   = DATAN2( S(2), S(1) )
C
C     Determine the right ascension of the Sun at the end of the
C     maneuver sequence.
      CALL SUN( XJD+EXPD, S )
      SFRA   = DATAN2( S(2), S(1) )
C
C     Target conditions for eccentricity
      ETX    = EX(N-1) - ( DELEX*DCOS(AVSRA) - DELEY*DSIN(AVSRA) )
      ETY    = EY(N-1) - ( DELEX*DSIN(AVSRA) + DELEY*DCOS(AVSRA) )
      ET     = DSQRT( ETX**2 + ETY**2 )
      ETRA   = DATAN2( ETY, ETX )
C
C     Determine maximum eccentricity between the target conditions
C     and the previously determined maximum eccentricity
      EMAX   = MAX( E0-DELEX, EF-DELEX )
C
C     Initial resonance angle
      ALPHA0 = DMOD( ETRA - SORA + 3.D0*PI, TWOPI ) - PI
C     Final resonance angle
      ALPHAF = DMOD( EFRA - SFRA + 3.D0*PI, TWOPI ) - PI
C
      IF ( IPRNT .EQ. 1 ) THEN
      WRITE(6,100) F1/RADDEG,DVEC,E,EF,E0SRA/RADDEG,EFSRA/RADDEG
  100 FORMAT(' *** ',F9.1,F12.4,2F14.6,2F10.1 )
C
      WRITE(6,110) DAY0,E,T0,ET,ETRA/RADDEG,SORA/RADDEG,
     &             TF,EF,EFRA/RADDEG,SFRA/RADDEG,
     &             ALPHA0/RADDEG,ALPHAF/RADDEG,F1/RADDEG
C
  110 FORMAT( '  Initial Time                =  ',1PE20.13,/,
     &        '  Initial Eccentricity        =  ',1PE20.13,/,
     &        '  Start of Free Drift Cycle   =  ',1PE20.13,/,
     &        '  Target Eccentricity         =  ',1PE20.13,/,
     &        '  Target Eccentricity Angle   =  ',1PE20.13,/,
     &        '  Target Sun Angle            =  ',1PE20.13,/,
     &        '  Final Time                  =  ',1PE20.13,/,
```

```
       &            '   Final Eccentricity             =       ',1PE20.13,/,
       &            '   Final Eccentricity Angle       =       ',1PE20.13,/,
       &            '   Final Sun Angle                =       ',1PE20.13,/,
       &            '   Initial Resonance Angle        =       ',1PE20.13,/,
       &            '   Final Resonance Angle          =       ',1PE20.13,/,
       &            '   True Anomaly for Burn          =       ',1PE20.13,/)
C
       ENDIF
       RETURN
       END SUBROUTINE PLTFIL
C
C      Generate a data file for plotting the longitudinal phase plane
C      (approximately 1000 points).
C
       IMPLICIT REAL*8(A-H,O-Z),INTEGER*4(I-N)
       COMMON /SYNC/    ASYNC,VSYNC,TSYNC,
      &        /ADJUST/ N,NM1,DT,TIME(20),DV(20),BURNT(20,3),IOVERN,F1,
      &        /SPECS/  EWPD,PD,DVEC,EMAR,EMAX,PSI,RM,
      &        /EPOCH/  DAY0,YEAR,XJD,
      &        /MOTION/ XLAM0,XLAMD0,XLAMS,XLAM(20),XLAMD(20),XLAMDD(20),
      &        /DATAD/  PI,TWOPI,RADDEG
       DIMENSION XLAMI(20)
       CHARACTER*15 FLNAME
       CHARACTER*1  FNAME(15)
       EQUIVALENCE (FNAME,FLNAME)
       DATA FNAME/'D',':','\','P','H','A','S','P','L','A','N',
      &           '.','0','0','0'/
       DATA INCR /0/
C
       INCR     = INCR + 1
       INCR0    = INCR / 100
       FNAME(13) = CHAR(48 + INCR0)
       INCR0    = (INCR - (INCR/100)*100) / 10
       FNAME(14) = CHAR(48 + INCR0)
       INCR0    = INCR - (INCR/10)*10 - (INCR/100)*100
       FNAME(15) = CHAR(48+INCR0)
       OPEN(9,FILE=FLNAME)
C
C      Integration time increment
       STEP  = EWPD / 1000.D0
       IMAX1 = DT / STEP
       IMAX2 = PD / STEP
C
C      Initialize to the starting longitude and drift rate
       XLAMI(1) = XLAM0
       WRITE(9,1000)TIME(1)-DAY0,XLAMI(1)/RADDEG,XLAMD0/RADDEG
C
C      Propagate motion during the intermediate/free drift by using the
C      average longitudinal accelerations
       IMAX = IMAX1
       DO 20 J = 1, N
          IF (J .EQ. N) IMAX = IMAX2
          DO 10 I = 1, IMAX
             DELT  = DBLE(I-1)*STEP
             XLAMDI = XLAMD(J)  + XLAMDD(J)*DELT
             XLAMR  = XLAMI(J)  + XLAMD(J)*DELT
      &                         + .5D0*XLAMDD(J)*DELT**2
 10          WRITE(9,1000)TIME(J)+DELT-DAY0,XLAMR/RADDEG,XLAMDI/RADDEG
          IF (J .EQ. N) GO TO 15
          XLAMDI     = XLAMD(J) + XLAMDD(J)*DT
          XLAMI(J+1) = XLAMI(J) + XLAMD(J)*DT + .5D0*XLAMDD(J)*DT**2
          WRITE(9,1000)TIME(J)+DT-DAY0,XLAMI(J+1)/RADDEG,XLAMDI/RADDEG
          GO TO 20
 15       XLAMDI     = XLAMD(N) + XLAMDD(N)*PD
          XLAMI(N+1) = XLAMI(N) + XLAMD(N)*PD + .5D0*XLAMDD(N)*PD**2
```

```
              WRITE(9,1000)TIME(N+1)-DAY0,XLAMI(N+1)/RADDEG,XLAMDI/RADDEG
    20   CONTINUE
C
         CLOSE(9)
  1000 FORMAT(3(1X,1PE20.13))
C
         RETURN
         END

SUBROUTINE DELTAV
C
C    Solve for the delta-V's corresponding to the intermediate drift rates
C    just following a maneuver.
C
         IMPLICIT REAL*8(A-H,O-Z),INTEGER*4(I-N)
         COMMON /SYNC/   ASYNC,VSYNC,TSYNC,
        &       /MOTION/ XLAM0,XLAMD0,XLAMS,XLAM(20),XLAMD(20),XLAMDD(20),
        &       /ADJUST/ N,NM1,DT,TIME(20),DV(20),BURNT(20,3),IOVBRN,F1,
        &       /DATAD/  PI,TWOPI,RADDEG
C
         COEFF = -VSYNC*TSYNC / (6.D0*PI)
         DV(1) = COEFF*(XLAMD(1) - XLAMD0)
         DO 10 I=1,N-1
    10      DV(I+1) = COEFF*(XLAMD(I+1) - XLAMD(I) - DT*XLAMDD(I))
C
         RETURN
         END
         SUBROUTINE DELTAT
C
C    Convert delta-V's into thrust burn times for all three phases of the
C    satellite's life (i.e., BOL,NOM,EOL).
C
         IMPLICIT REAL*8(A-H,O-Z),INTEGER*4(I-N)
         COMMON /DATAD/  PI,TWOPI,RADDEG,
        &       /ADJUST/ N,NM1,DT,TIME(20),DV(20),BURNT(20,3),IOVBRN,F1
         DIMENSION THRUST(3), XM(3)
C
         DATA THRUST/ 21.23D0,20.08D0,18.92D0 /,
        &      XM    / 1501.21D0,1363.49D0,1225.77D0 /,
        &      TIMMAX/ 500.D0 /
C    Maximum allowed time for thrust duration is set at 500 mms
C    Over-burn flag for alarm condition
         IOVBRN = 0
C
C    Required thruster burn time per delta-V (milleseconds)
         CEFFT = 34.5D0*RADDEG
C    Only look at nominal life
C
C    DO 10 LIFE = 1, 3
         LIFE = 2
         XMSC = XM(LIFE)
C        Compute effective thrust
         TEFF = 4.D0*THRUST(LIFE)*DCOS(CEFFT)
         DO 10 I=1,N
             BURNT(I,LIFE) = DABS((DV(I)*XMSC / TEFF)*1000.D0)
             IF (BURNT(I,LIFE) .LE. TIMMAX) GO TO 10
                 IOVBRN = 1
    10       CONTINUE
C
         RETURN
         END
         SUBROUTINE GAUSSJ(A,DET,IA,N,L,S)
C
C    Performs forward elimination phase upon matrix [A]
C
         IMPLICIT REAL*8(A-H,O-Z),INTEGER*4(I-N)
         DIMENSION A(IA,N),L(N),S(N)
C
```

```
      DO 10 I = 1, N
         L(I) = I
         S(I) = 0.D0
         DO 10 J = 1, N
            TEMP = DABS(A(I,J))
10          S(I) = DMAX1(S(I),TEMP)
C
      NM1 = N - 1
      DO 30 K = 1, NM1
         RMAX = 0.D0
         DO 20 I = K, N
            R = DABS(A(L(I),K)) / S(L(I))
            IF (R .LE. RMAX) GO TO 20
            J = I
            RMAX = R
20       CONTINUE
         LK = L(J)
         L(J) = L(K)
         L(K) = LK
         KP1 = K + 1
         DO 30 I = KP1, N
            XMULT = A(L(I),K) / A(LK,K)
            A(L(I),K) = XMULT
            DO 30 J = KP1, N
30             A(L(I),J) = A(L(I),J) - XMULT*A(LK,J)
C
            DET = A(L(1),1)
         DO 40 I = 2, N
40          DET = DET * A(L(I),I)
C
      RETURN
      END
      SUBROUTINE SOLVE(A,IA,N,L,B,X)
C
C     Processing of vector B and evaluation of solution vector X
C
      IMPLICIT REAL*8(A-H,O-Z),INTEGER*4(I-N)
      DIMENSION A(IA,N),L(N),B(N),X(N)
C
      NM1 = N - 1
      DO 10 J=1,NM1
         JP1 = J + 1
         DO 10 I=JP1,N
10          B(L(I)) = B(L(I)) - A(L(I),J)*B(L(J))
C
      X(N) = B(L(N)) / A(L(N),N)
      DO 30 I=1,NM1
         NMIP1 = N - I + 1
         SUM = B(L(NMIP1-1))
         DO 20 J=NMIP1,N
20          SUM = SUM - A(L(N-I),J)*X(J)
30       X(N-I) = SUM / A(L(N-I),N-I)
C
      RETURN
      END
```

What is claimed is:

1. A method for controlling East/West motion of a geostationary satellite in an orbit characterized by a mean eccentricity vector, said method comprising the steps of:

targeting means eccentricity of said orbit such that total change in velocity of said orbit for said satellite places a target mean eccentricity vector at a first state which will result in a subsequent means eccentricity vector within a specified tolerance during a period of free drift; thereafter targeting means longitude and means drift rate of said orbit as a function of change in said target mean eccentricity vector and mean longitudinal acceleration, said mean longitudinal acceleration including bimonthly variational effects due to Earth, Moon and Sun gravitational effects such that total longitude (East/West motion relative to a station on the Earth) is constrained within a specified deadband;

apportioning said total change in velocity to a plurality of changes in velocity to control longitude and drift rate of said orbit; and imparting said changes in velocity to said orbit in a plurality of maneuvers by said satellite and providing specified wait times between said maneuvers in integer multiples of one-half day to attain said first condition.

2. A method for controlling East/West motion of a geostationary satellite in an orbit characterized by a mean eccentricity vector, said method comprising the steps of:

targeting means eccentricity of said orbit in a current control cycle such that total change in velocity of said orbit for said satellite places a target mean eccentricity vector at a first state which will result in a subsequent mean eccentricity vector within a specified tolerance during a period of free drift; thereafter targeting mean longitude and mean drift rate of said orbit as a function of change in said target mean eccentricity vector and mean longitudinal acceleration in said current control cycle, such that total longitude (East/West motion relative to a station on the Earth) is constrained within a specific deadband;

apportioning said total change in velocity to a plurality of changes in velocity to control longitude and drift rate of said orbit in said current control cycle; and imparting said changes in velocity to said orbit in said current control cycle in a plurality of maneuvers by said satellite and providing specified wait times between said maneuvers in integer multiples of one-half day to attain said first condition.

3. The method according to claim 2 wherein said imparting step comprises at least three maneuvers and wherein there is an odd number comprising at least three of said maneuvers in order to guarantee dual-axis symmetry in a phase plane of longitude versus drift rate to maximize use of said deadband.

4. The method according to claim 2 wherein said imparting step comprises at least four maneuvers and there is an even number of maneuvers in a case where there is a reversal in direction of said mean longitudinal acceleration near an equilibrium point in an orbit due to luni-solar effects and in order to guarantee dual-axis symmetry in a phase plane of longitude versus drift rate to maximize use of said deadband.

5. The method according to claim 2 wherein said imparting step comprises at least two maneuvers in a case where there is a reversal in direction of said mean longitudinal acceleration near an equilibrium point in an orbit due to luni-solar effects.

6. The method according to claim 2 wherein said imparting step comprises at least two maneuvers in order to guarantee single-axis symmetry in a phase plane of longitude versus drift rate to minimize the number of maneuvers with symmetry about a drift rate axis.

7. The method according to claim 2 wherein said mean eccentricity targeting step and said mean longitude and mean drift rate targeting step each further comprises selecting an arbitrary stationkeeping period as an input.

8. The method according to claim 2 wherein said targeting steps include determining target conditions such that conditions favor subsequent stationkeeping cycles.

9. A method for controlling East/West motion of a geostationary satellite in an orbit characterized by a mean eccentricity vector, said method comprising the steps of:

targeting means eccentricity of said orbit by determining said target means eccentricity vector to lag an average Earth-Sun line, said average Earth-Sun line being the location of the Earth-Sun line at a midpoint in time over a period of free drift such that total change in velocity of said orbit for said satellite places a target mean eccentricity vector at a first state which will result in a subsequent mean eccentricity vector within a specified tolerance during said period of free drift; thereafter targeting means longitude and mean drift rate of said orbit in a current control cycle as a function of change in said target mean eccentricity vector and mean longitudinal acceleration, such that total longitude (East/West motion relative to a station on the Earth) is constrained within a specified deadband;

apportioning said total change in velocity to a plurality of changes in velocity to control longitude and drift rate of said orbit in said current control cycle; and imparting said changes in velocity to said orbit in said current control cycle in a plurality of maneuvers by said satellite and providing specified wait times between said maneuvers in integer multiples of one-half day to attain said first condition.

10. A method for controlling East/West motion of a geostationary satellite in an orbit characterized by a mean eccentricity vector, said method comprising the steps of:

targeting mean eccentricity of said orbit by calculating an orbital ephemeris for a future East/West stationkeeping period to obtain a table of orbital elements versus time, said orbital ephemeris includes a force model of solar radiation pressure on said satellite, gravitational effects of the Earth, gravitational effects of the Moon and gravitational effects of the Sun under conditions where luni-solar effects dominate said deadband in order preserve propellant such that total change in velocity of said orbit for said satellite places a target mean eccentricity vector at a first state which will result in a subsequent mean eccentricity vector within a specified tolerance during a period of free drift; thereafter targeting means longitude and mean drift rate of said orbit in a current control cycle as a function of change in said target mean eccentricity vector and mean longitudinal acceleration, such that total longitude (East/West motion relative to a station on the Earth) is constrained within a specified deadband;

apportioning said total change in velocity to a plurality of changes in velocity to control longitude and drift rate of said orbit in said current control cycle; and imparting said changes in velocity to said orbit in said current control cycle in a plurality of maneuvers by said satellite and providing specified wait times between said maneuvers in integer multiples of one-half day to attain said first condition.

* * * * *